United States Patent [19]

Lund

[11] Patent Number: 4,966,404
[45] Date of Patent: Oct. 30, 1990

[54] WINDSHIELD VISOR FOR TRUCKS HAVING CAB ROOF LIGHTS

[75] Inventor: Allan W. Lund, Minneapolis, Minn.

[73] Assignee: Lund Industries, Inc., Minneapolis, Minn.

[21] Appl. No.: 285,629

[22] Filed: Dec. 16, 1988

[51] Int. Cl.$^5$ .............................................. B60J 3/00
[52] U.S. Cl. ............................ 296/95.1; 160/DIG. 3; D12/191
[58] Field of Search ................. 296/95.1, 180.1–180.3; 160/370.2, DIG. 3; 362/74, 80; D12/191

[56] References Cited

U.S. PATENT DOCUMENTS

| | | | |
|---|---|---|---|
| D. 273,672 | 5/1984 | Lund | D12/191 |
| D. 288,309 | 2/1987 | Lund | D12/191 |
| D. 291,295 | 8/1987 | Lund | D12/191 |
| D. 301,028 | 5/1989 | Buck | D12/191 |
| 4,018,472 | 4/1977 | Mason, Jr. | 296/180.2 |
| 4,726,619 | 2/1988 | Haugestad | 296/95.1 |

OTHER PUBLICATIONS

*Hot Rod*, Aug. 1975, p. 96.

Primary Examiner—Dennis H. Pedder
Attorney, Agent, or Firm—Merchant, Gould, Smith, Edell, Welter & Schmidt

[57] ABSTRACT

A windshield visor for trucks which trucks are or may be provided with clearance lights mounted on the roof of the vehicle cab of the truck. The visor extends transversely across the width of the cab and is provided with an upper, forwardly extending sun shield portion, a downwardly depending lip at the forward edge of such shield portion and a rearwardly extending lip at the bottom of the downwardly depending lip. The lip configuration besides providing a certain degree of strength and rigidity to the visor, increases the aesthetic values of the visor. The rearward section of the forwardly extending sun shield portion includes air venting areas and light housing passing areas and is formed to conform to the profile of the roof surface of the vehicle to allow the placed lights to extend upwardly therethrough and for attachment of the visor to the cab.

6 Claims, 2 Drawing Sheets

WINDSHIELD VISOR FOR TRUCKS HAVING CAB ROOF LIGHTS

FIELD OF THE INVENTION

This invention relates generally to windshield visors for trucks and more particularly to a windshield visor for trucks which is provided with light housing passages therethrough to allow clearance lights to be mounted on the roof of the vehicle with light housing passing areas defining profiled attachment areas for connecting of the visor to the roof of the vehicle.

SHORT SUMMARY OF THE INVENTION

The present invention generally relates to a windshield visor for trucks mounted on the roof of the cab of the truck to substantially shield the driver against sun glare and the like. The particular visor disclosed herein includes a plurality of light housing passages for the mounting of the visor over cab roof mounted lights. The particular vehicle to which this visor is directed has factory available mounted lights and these are positioned on the roof of the cab of the vehicle when purchased. The unit obviously could be utilized with other vehicles in conjunction with lights that are placed in accordance with the passages through the visor.

Applicant's visor includes a forwardly extending, sun blocking surface extending transversely of the cab and forwardly of the roof line of the cab with the rearmost portions thereof defining air passage areas and mounting areas which are designed in conformance to the profile of the leading edge of the cab. These conforming portions also define openings for the lights mounted or to be mounted on the cab and further define profiled areas of attachment for position positioning and connection of the visor to the cab.

The forward leading edge of the sun blocking area includes a downwardly and rearwardly depending, first lip portion to provide strength and aesthetic characteristics to the visor. This downwardly extending portion of such leading edge is canted rearwardly to not only provide a support function but to eliminate an air drag factor which would be present if this edge were perpendicular to forward movement of the vehicle. A second lip portion extends rearwardly from the bottom of the first lip.

Mounting conforming ears are provided on the transverse ends of the visor for conformance to the profile of the cab and to provide additional mounting areas on the respective sides of the front roof support post of the cab roof and the area directly therebehind and these ears are curvilinearly designed at the rearward edges thereof to conform to the normally provided water gutter which is arranged adjacent the top of a vehicle door.

The entire visor is formed of a fiberglas material and the frontal lip and light housing and passing and roof profile conforming areas provide a degree of rigidity and structural support to the unit.

BACKGROUND AND OBJECTS OF THE INVENTION

Applicant believes himself to be the designer and originator of various sunvisors for trucks and these include the following listed Patents of which he is the inventor and applicant: U.S. Pat. Nos. D. 273,672; D. 288,309; D. 288,310; D. 291,295; D. 239,705 and application Ser. No. 336,565 which is related to two preceding applications, Ser. Nos. 066,769, abandoned and 528,981, now U.S. Pat. No. D. 291,295. In addition to this art all of which applicant is the named inventor, the art as cited in the prosecution of the pending application must be considered. This art includes a Patent to Canal, U.S. Pat. No. 4,149,749; Brown, U.S. Pat. No. 3,214,216; Dieterich, U.S. Pat. No. 2,566,934; Flavin, U.S. Pat. No. 2,534,763; Kingsley, U.S. Pat. No. 4,412,698; Branch, U.S. Pat. No. 2,599,809; Zies et al, U.S. Pat. No. 2,567,501; Haguestead, U.S. Pat. No. 4,726,619; and a British Patent No. 829,154. One of the primary differences between the cited art and applicant's own prior art is the utilization of light housing passage areas defined in the uppermost surface of the visor such that lights that are ordinarily provided as original equipment manufacturers articles will be received therethrough or for the mounting of a plurality of lights across the roof of the vehicle cab which allows for the attachment of such lights directly to the roof of the cab. A difference for consideration with regard to the light mounting apertures is the arrangement of support depressions and cab roof profile conforming depressions in close association with the light housing areas to provide ease of mounting of the unit and light visibility to oncoming vehicles.

It is therefore an object of the applicant's invention to provide a sunvisor for mounting on cab roofs of vehicles having light passing apertures formed therein which will permit attachment of lights directly to the roof of the cab and provide clearance such that the visor may be placed thereabout without affecting the mounting of the lights to the cab roof.

It is a further object of the applicant's invention to provide a sunvisor for mounting on the roofs of cab roof portions of vehicles which will extend forwardly therefrom to provide a sun blocking visor unit which includes a plurality of light housing passing apertures therethrough with the areas adjacent such apertures conforming to the profile of the roof of the cab to provide structural integrity to the visor and affording an ease of mounting the visor to the cab roof.

It is still a further object of the applicant's invention to provide a sun visor for mounting on the roofs of vehicle cabs wherein the cab is provided with a plurality of lights across the transverse dimension of the roof with the visor providing apertures in accordance with such spacing of such lights and providing the areas about the apertures to conform to the profile of the roof of the truck and to be positioned in non-interfering relation to the light being emitted from the light units.

These and other objects and advantages of the applicant's visor will more fully appear from a consideration of the accompanying description made in conjunction with the provided drawings.

SHORT DESCRIPTION OF THE DRAWINGS

DESCRIPTION OF A PREFERRED FORM OF THE INVENTION

Figure 1:
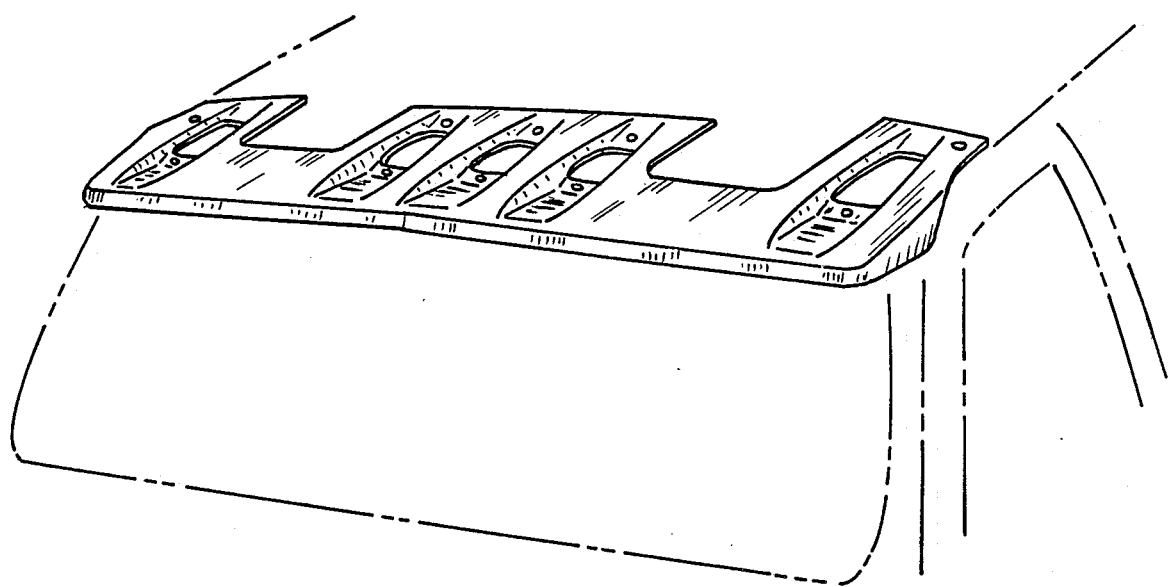
FIG. 1 is a perspective view of a windshield visor embodying the concepts of the applicant's invention and having a portion of a typical vehicle cab provided in phantom lines in relation thereto to illustrate the mounting position of the visor with respect to the cab.

In accordance with the accompanying drawings applicant's invention for a windshield visor for trucks which truck cab is provided with a plurality of roof top or clearance lights thereon is generally designated 10 and is illustrated in FIG. 1 as being mounted upon the frontal cab portion of a cab vehicle, the vehicle portions being illustrated through phantom lines. It should be understood that, although a particular profile shape, as particularly illustrated in FIG. 7 is illustrated, this profile is illustrative of one particular truck cab to which the unit may be attached and the curvatures as illustrated in FIG. 7 and as will be discussed herein as providing mounting areas to the vehicle cab may be modified without departing from the scope of the invention.

Figure 7:
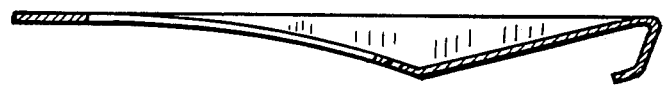
FIG. 7 is a vertical section taken substantially along lines 7—7 of FIG. 2 which particularly illustrates an area of the visor through which a light passing aperture is provided.
Figure 1:
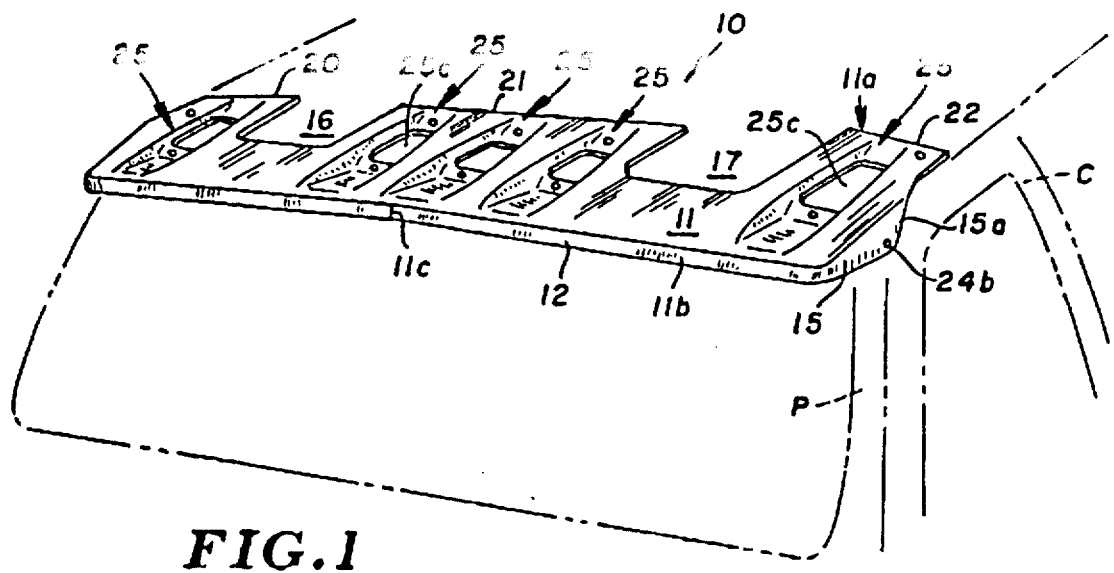
Figure 2:
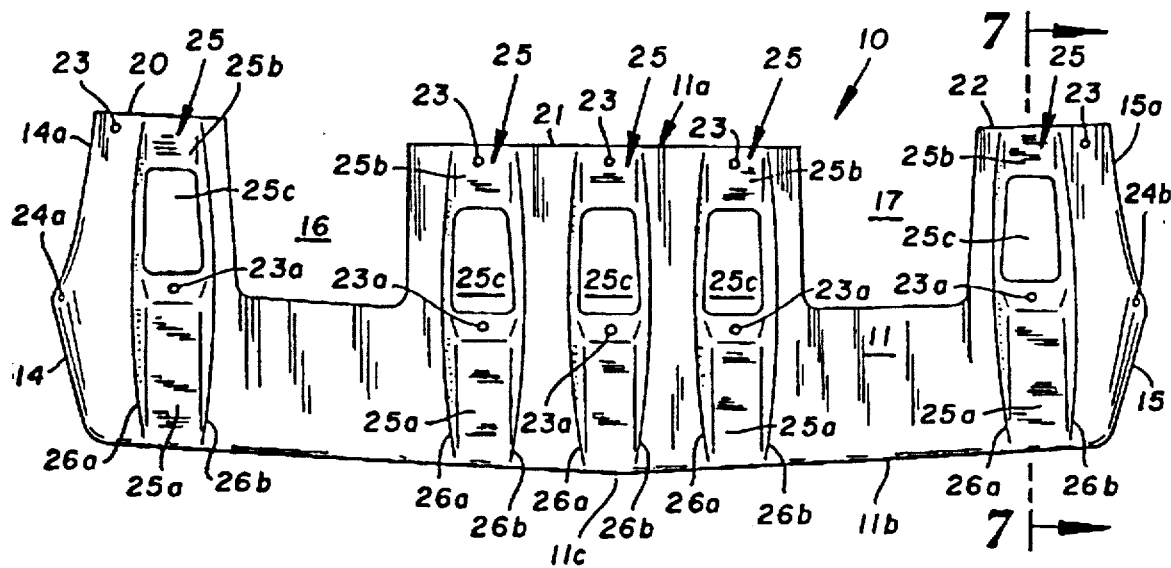
Figure 3:
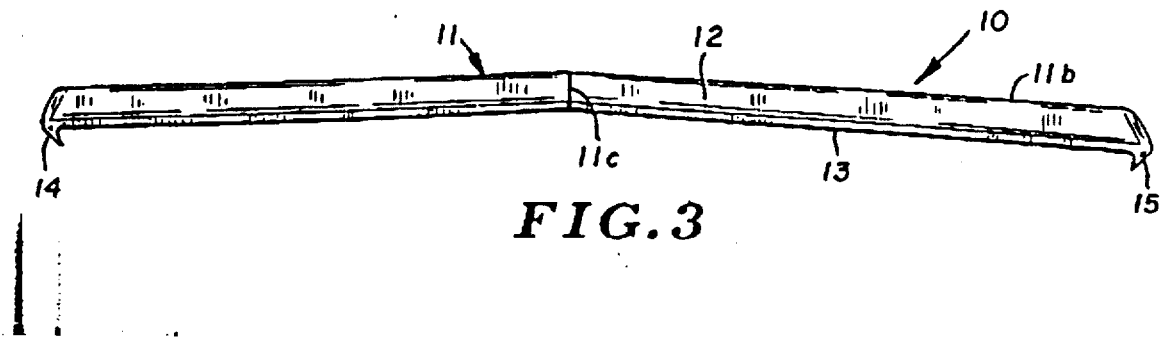
Figure 4:
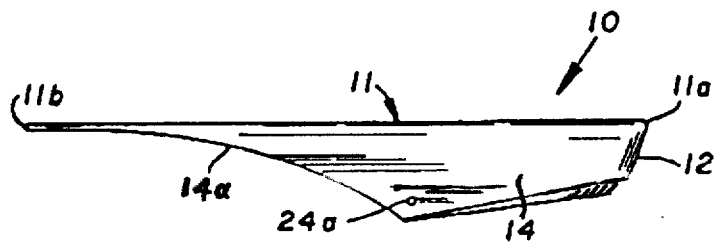
Figure 5:
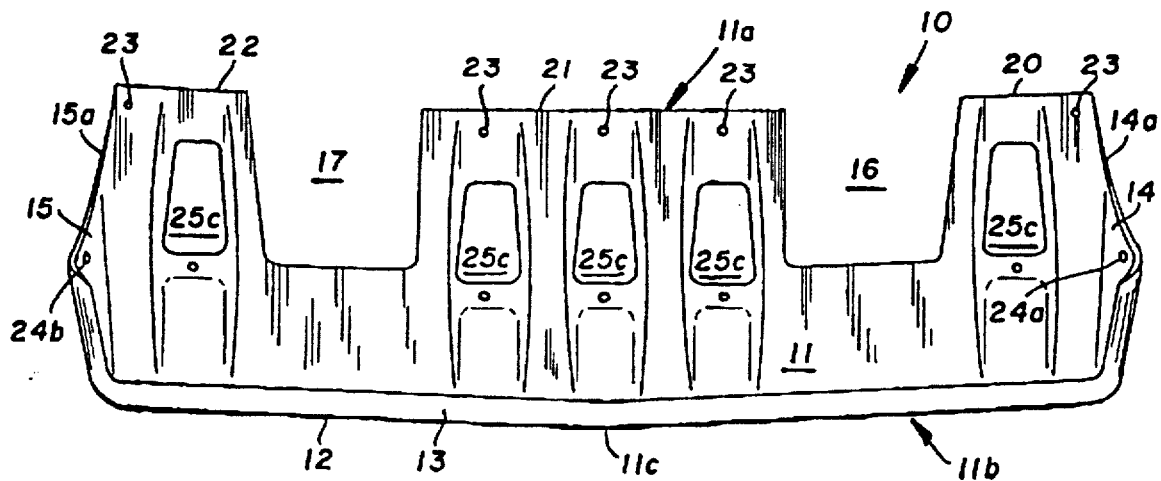
Figure 6:
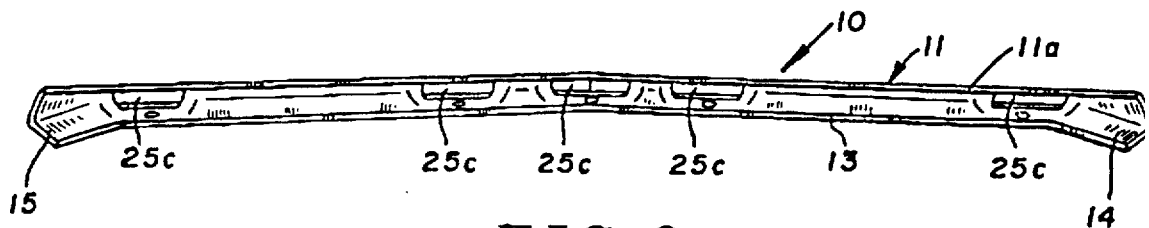
Figure 7:
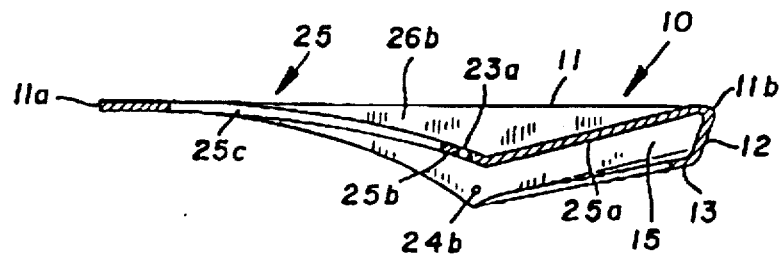

As best illustrated in FIG. 7 the visor 10 includes several distinct areas. These areas include an uppermost primary sun blocking surface 11 having and defining a rearward 11a and a forward extending end 11b; a downwardly and rearwardly depending lip structure inCluding a downwardly and rearwardly directed surface 12 is provided at the forward end of the primary visor surface 11 and a second surface depending from the lower edge of said frontal surface 12 being designated 13 directed rearward from the lower edge of said frontal surface 12. The combination of the downwardly depending surface 12 and rearwardly depending surface 13 define a frontal lip which not only provides structural integrity to the forward end of the visor 10 but also increases the aesthetic contributions of the unit.

Figure 2:
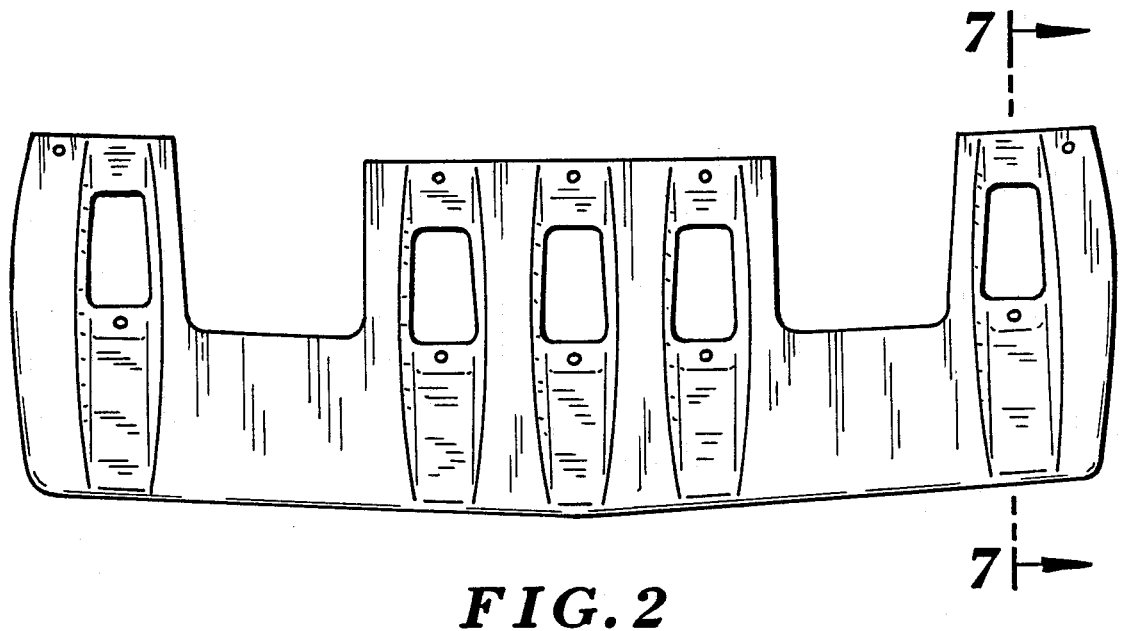
FIG. 2 is a top plan view of the visor.
Figure 5:
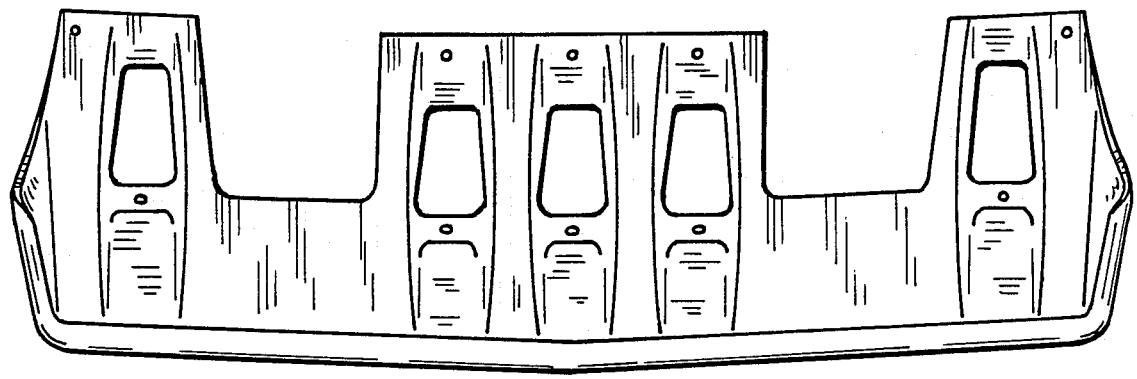
FIG. 5 is a bottom plan view thereof.

As illustrated in FIGS. 2 and 5, the primary surface 11 of the visor is best defined as providing an oblique V configuration having a central forwardmost extending area 11c. This central apex besides providing aesthetic considerations to the unit also breaks the frontal surface 12 of the unit to provide a more wind efficient or air deflecting concept to the unit.

Figure 3:
FIG. 3 is a front elevation view thereof.
Figure 6:
FIG. 6 is a rear elevation view.

As illustrated in FIGS. 3 and 6, the central portion of the primary surface 11 is raised above the transverse ends thereof while the rearwardmost edge 11a thereof is substantially planar.

Figure 4:
FIG. 4 is a side elevation view thereof, the opposite side of the visor being identical thereto.

As illustrated, the transverse ends of the primary surface 11 and forward lip 12 and rearwardly depending lip section 13 are smoothly integrated into a pair of mounting ears 14-15 with the lip structures 12-13 smoothly converging into a substantially flat, singular planar area at the rearmost portion of the ears 14-15 to provide a planar surface for contact with the sides of cab C and more particularly against the front windshield post P of the cab. As particularly illustrated in FIGS. 1 and 4 the rear of ear sections 14-15 are provided with an upwardly directed curvilinear surface 14a-15a tterminating at the rearwardmost edge 11a of the primary visor surface 11. In practical utilizations this curvilinear surface will normally agree to the rain gutter trim that is provided on most vehicle cabs with the rain gutter trim being known to cover the entire door area.

As best illustrated in FIGS. 2 and 5 the rearmost surface 11a of the primary sun block surface 11 includes transversely, spaced notched areas 16-17 of a predetermined width and extending forwardly from the rear surface 11a of the primary visor surface 11 a sufficient dimension to permit release and escape of air from below the visor as will be resultant from forward movement of the vehicle.

Again, as particularly illustrated in FIGS. 2 and 5 the notched areas 16-17 provide continuous surface areas of the primary visor surface 11 on either side thereof and between such notches. These areas are respectively designated 20-21-22. Such areas 20-21-22 serve a dual function in that they provide areas of attachment of the visor 10 to the roof of the cab and a plurality of fastening receiving apertures, each designated 23, are arranged in such areas for proper attachment of the visor to the cab. Additionally attachment apertures 24a-24b may be provided through the aforementioned ears 14-15 of the visor 10.

As particularly illustrated in FIGS. 2 and 5, the rearward extending sections 20-21-22 of the primary surface 11 of the visor 10 are provided respectively with one, three and one light receiving and housing areas 25.

As illustrated in the accompanying views and particularly FIG. 7 the light receiving areas 25 embody a profile formed area for mounting the visor and supporting the visor against the forwardmost end of the cab C and this profile area is defined by a first surface 25a extending downwardly and rearwardly from front surface 11b of the primary surface 11 of the visor 10 and thereafter extending rearwardly and upwardly in cab profile agreement to meet with the primary surface 11 of the visor 10 and adjacent the rear end 11a thereof. This profiled area is designated 25b and a light receiving or passing aperture 25is formed in this profiled area 25b. As illustrated additional attachment receiving apertures 23a are provided forward of the light receiving area 25c.

Angularly and arcuately arranged sides 26a-26b extend from the downwardly and rearwardly arranged angle surface 25a and the profiled surface 25b of the housing light housing areas 25 to the primary surface 11 of the visor 10.

Housing areas 25 serve a dual function in that they provide appropriate surfaces for placement on the cabs forward profile for the passage of attachment elements therethrough and provide a certain degree of rigidity and strength to the entire visor unit 10. The sloped surfaces 25a, when the same is properly positioned through contact of the profile area 25b to the vehicle cab, permit total visibility of the light units which pass through the light apertures 25c.

It should be obvious to anyone skilled in the art that it would not be necessary for a manufacturer of the visor 10 to provide the apertures 25c for use of the visor if the vehicle is delivered from the manufacturer without lights. Should the purchaser of the vehicle and visor wish to install lights, the housing areas 25c may simply be cut from the unit 10.

The plurality of light mounting areas 25 defined in the applicant's visor provides a substantial number of defined roof profile contacting areas for not only positively attaching such visor to the vehicle but for providing a high degree of support and therefore structural integrity to the visor.

It should be obvious that the applicant has provided a new and unique visor modification which includes the aspects and inventive concepts of having clearance lights passing therethrough without affecting the strength and rigidity and structural integrity of the visor.

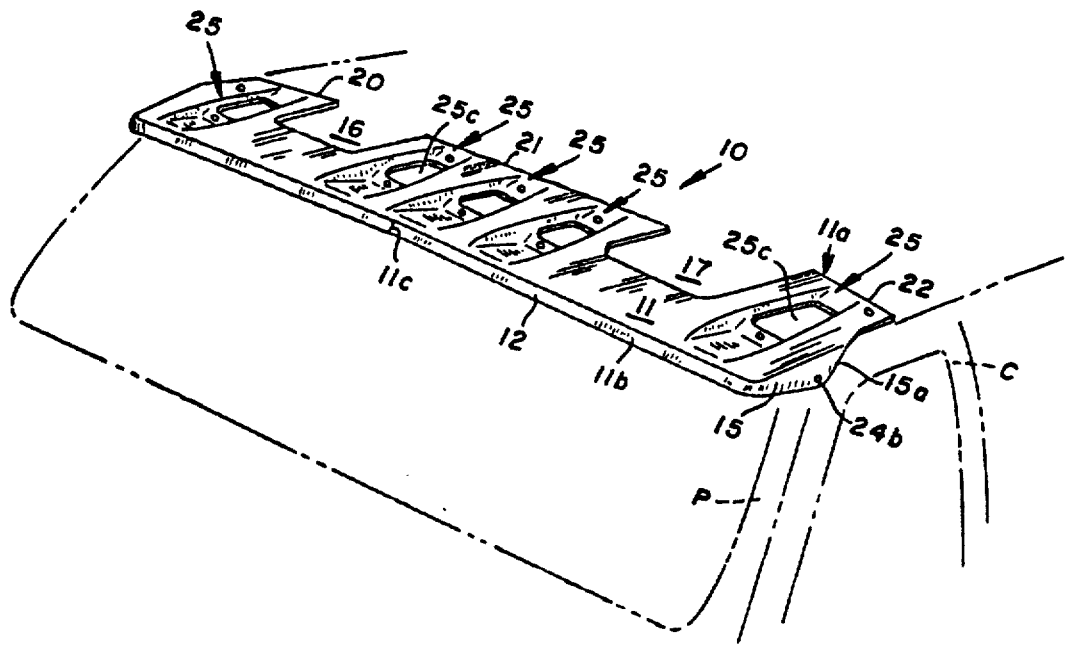

What is claimed is:

1. A windshield visor adapted for mounting to the forwardmost portion of the cab roof of a vehicle, said visor including:
   a. a first, primary, shielding surface providing a forward and a rearward end and longitudinally transversely of the width of the roof of the vehicle;
   b. at least a pair of air venting notched areas extending from said rear end of said first, primary, shielding surface and being spaced on either side of a center of the longitudinal extent of said first, primary shielding surface;
   c. a first downwardly extending surface unitary with said forward end of said first surface;
   d. a second rearwardly extending surface unitary with the lower end of said first, downwardly depending surface to form therewith a lip member extending transversely of said first shielding surface.
   e. A light housing areas and apertures formed in said first shielding surface generally adjacent said venting notched areas, said light housing areas and apertures defined by:
      1. a first surface extending downwardly and rearwardly from said forward end of said first, primary shielding surface;
      2. a second surface extending upwardly and rearwardly from said first surface and formed to agree with the frontal profile of the cab roof of the vehicle; and
      3. said light housing apertures surrounded by said second surface; and
   f. means for attaching the visor to the cab roof including fastener receiving apertures arranged adjacent the rearward ends of said first, primary, shielding surface.

2. The windshield visor as set forth in claim 1 further comprising downwardly extending ears provided on transverse ends of said first, primary shielding surface being formed to agree with a side profile of the cab roof.

3. The windshield visor as set forth in claim 2 wherein said first downwardly extending surface and said second rearwardly extending surface of said lip member are contiguously formed with said ears and provide a single mounting area.

4. The windshield visor as set forth in claim 1, wherein said light housing areas further comprise side surfaces extending upwardly from said first downwardly and rearwardly extending surface and said second upwardly and rearwardly extending surface to said first, primary shielding surface.

5. The windshield visor as set forth in claim 4 wherein said attaching means comprises attachment receiving apertures formed in said light housing area's second surface to accommodate attachment of said visor in areas both above and below said light housing passing and receiving apertures.

6. A windshield visor adapted for mounting to a roof of a vehicle's cab having light fixtures, the visor comprising:
   a. a primary shielding surface having a back end extending over the vehicle's roof and front end extending away from the roof and generally over the vehicle's windshield;
   b. venting means defined in said primary shielding surface for venting air through the visor over the vehicle's roof;
   c. light housing means defined in said primary shielding surface for receiving the light fixtures through said primary shielding surface and for providing structural support to said primary shielding surface, said light housing means including a surface which conforms to the vehicle's roof, said surface surrounding an aperture defined therein for receiving the light fixture; and
   d. attaching means for securing the visor to the roof of the vehicle.

* * * * *

UNITED STATES PATENT AND TRADEMARK OFFICE
CERTIFICATE OF CORRECTION

PATENT NO. : 4,966,404
DATED : October 30, 1990
INVENTOR(S) : Allan W. Lund

It is certified that error appears in the above-identified patent and that said Letters Patent is hereby corrected as shown below:

Column 1, line 56, delete the words "and passing".

Column 3, lines 26-27, "inCluding" should be changed to --including--.

Column 4, line 32, "25is" should be changed to --25c is--.

Column 5, line 21, delete "A".

Signed and Sealed this

Twenty-eighth Day of April, 1992

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,966,404

DATED : October 30, 1990

INVENTOR(S) : Allan W. Lund

It is certified that error appears in the above-identified patent and that said Letters Patent is hereby corrected as shown below:

The title page should be deleted to appear as per attached title page.
Drawings sheets should be deleted be replaced with drawings sheets consisting of figures 1-7, as shown on the attached pages.

Signed and Sealed this

Seventeenth Day of August, 1993

Attest:

BRUCE LEHMAN

Attesting Officer

Commissioner of Patents and Trademarks

United States Patent [19]

Lund

[11] Patent Number: 4,966,404
[45] Date of Patent: Oct. 30, 1990

[54] WINDSHIELD VISOR FOR TRUCKS HAVING CAB ROOF LIGHTS

[75] Inventor: Allan W. Lund, Minneapolis, Minn.

[73] Assignee: Lund Industries, Inc., Minneapolis, Minn.

[21] Appl. No.: 285,629

[22] Filed: Dec. 16, 1988

[51] Int. Cl.$^5$ ................................................ B60J 3/00
[52] U.S. Cl. ............................ 296/95.1; 160/DIG. 3; D12/191
[58] Field of Search ................ 296/95.1, 180.1–180.3; 160/370.2, DIG. 3; 362/74, 80; D12/191

[56] References Cited

U.S. PATENT DOCUMENTS

| | | | |
|---|---|---|---|
| D. 273,672 | 5/1984 | Lund | D12/191 |
| D. 288,309 | 2/1987 | Lund | D12/191 |
| D. 291,295 | 8/1987 | Lund | D12/191 |
| D. 301,028 | 5/1989 | Buck | D12/191 |
| 4,018,472 | 4/1977 | Mason, Jr. | 296/180.2 |
| 4,726,619 | 2/1988 | Haugestad | 296/95.1 |

OTHER PUBLICATIONS

*Hot Rod*, Aug. 1975, p. 96.

Primary Examiner—Dennis H. Pedder
Attorney, Agent, or Firm—Merchant, Gould, Smith, Edell, Welter & Schmidt

[57] ABSTRACT

A windshield visor for trucks which trucks are or may be provided with clearance lights mounted on the roof of the vehicle cab of the truck. The visor extends transversely across the width of the cab and is provided with an upper, forwardly extending sun shield portion, a downwardly depending lip at the forward edge of such shield portion and a rearwardly extending lip at the bottom of the downwardly depending lip. The lip configuration besides providing a certain degree of strength and rigidity to the visor, increases the aesthetic values of the visor. The rearward section of the forwardly extending sun shield portion includes air venting areas and light housing passing areas and is formed to conform to the profile of the roof surface of the vehicle to allow the placed lights to extend upwardly therethrough and for attachment of the visor to the cab.

6 Claims, 2 Drawing Sheets